United States Patent
Kellner (10) Patent No.: US 12,535,559 B2
(45) Date of Patent: Jan. 27, 2026

(54) METHOD FOR RECOGNIZING ROAD USERS IN AN ENVIRONMENT OF A VEHICLE ON THE BASIS OF MEASUREMENTS OF A RADAR SENSOR, BY IDENTIFYING FAULTY DETECTIONS, AND COMPUTING DEVICE

(71) Applicant: Bayerische Motoren Werke Aktiengesellschaft, Munich (DE)

(72) Inventor: Dominik Kellner, Dachau (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 378 days.

(21) Appl. No.: 18/020,814

(22) PCT Filed: Aug. 6, 2021

(86) PCT No.: PCT/EP2021/072024
§ 371 (c)(1),
(2) Date: Feb. 10, 2023

(87) PCT Pub. No.: WO2022/033980
PCT Pub. Date: Feb. 17, 2022

(65) Prior Publication Data
US 2023/0305109 A1      Sep. 28, 2023

(30) Foreign Application Priority Data
Aug. 11, 2020   (DE) ............... 10 2020 121 108.2

(51) Int. Cl.
*G01S 7/41*      (2006.01)
*G01S 13/931*    (2020.01)

(52) U.S. Cl.
CPC ............ *G01S 7/414* (2013.01); *G01S 13/931* (2013.01)

(58) Field of Classification Search
CPC .......... G01S 13/46; G01S 13/931; G01S 7/41; G01S 7/414
See application file for complete search history.

(56) References Cited

U.S. PATENT DOCUMENTS

| 8,570,213 B2 * | 10/2013 | Nishiyama | ............. G01S 7/292 |
| | | | 342/91 |
| 9,810,782 B2 * | 11/2017 | Schiffmann | ............ G01S 7/415 |

(Continued)

FOREIGN PATENT DOCUMENTS

| DE | 10 2004 047 087 A1 | 3/2006 |
| EP | 2 667 219 A1 | 11/2013 |
| JP | 2001-116839 A | 4/2001 |

OTHER PUBLICATIONS

International Search Report (PCT/ISA/210) issued in PCT Application No. PCT/EP2021/072024 dated Nov. 22, 2021 with English translation (five (5) pages).

(Continued)

*Primary Examiner* — Peter M Bythrow
(74) *Attorney, Agent, or Firm* — Crowell & Moring LLP (57) ABSTRACT

A method for recognizing road users in an environment of a vehicle includes determining detections that describe potential objects in the environment, identifying faulty detections within the detections, and recognizing the road users on the basis of the detections other than the faulty detections. Identifying the faulty detections further includes, for each detection, checking, on the basis of the spatial position with respect to other detections, whether the detection originates from a reflection effect of a plurality of predefined reflection effects of the radar signal, wherein the plurality of predefined reflection effects describes at least one additional reflection of the radar signal after a first reflection of the radar signal by an object.

17 Claims, 6 Drawing Sheets

(56) References Cited

U.S. PATENT DOCUMENTS

| | | | |
|---|---|---|---|
| 10,261,172 B2* | 4/2019 | Lim | G01S 13/931 |
| 10,656,248 B2* | 5/2020 | Bilik | G01S 13/931 |
| 11,754,674 B2* | 9/2023 | Amizur | G01S 7/412 |
| | | | 342/195 |
| 2003/0122703 A1* | 7/2003 | Kishida | G01S 13/345 |
| | | | 342/107 |
| 2003/0179129 A1* | 9/2003 | Tamatsu | G01S 13/582 |
| | | | 342/107 |
| 2009/0009383 A1* | 1/2009 | Nakanishi | G01S 3/20 |
| | | | 342/118 |
| 2009/0121915 A1* | 5/2009 | Randler | G01S 13/584 |
| | | | 342/70 |
| 2010/0214153 A1* | 8/2010 | Kikuchi | G01S 7/2921 |
| | | | 342/70 |
| 2012/0119937 A1* | 5/2012 | Yamada | G01S 7/4021 |
| | | | 342/70 |
| 2013/0314272 A1* | 11/2013 | Gross | G01S 13/931 |
| | | | 342/70 |
| 2016/0274232 A1* | 9/2016 | Schiffmann | G01S 7/415 |
| 2017/0261602 A1* | 9/2017 | Olshansky | G01S 7/411 |
| 2018/0259634 A1* | 9/2018 | Okamoto | G01S 13/726 |
| 2018/0341012 A1* | 11/2018 | Takada | G01S 7/414 |
| 2020/0172108 A1* | 6/2020 | Ziegler | G08G 1/165 |
| 2020/0363522 A1* | 11/2020 | Ishikawa | G01S 7/403 |
| 2021/0018592 A1* | 1/2021 | Laghezza | G01S 13/34 |
| 2021/0055375 A1* | 2/2021 | Smith | G01S 7/295 |
| 2021/0104027 A1* | 4/2021 | Longman | G01S 13/726 |
| 2021/0192235 A1* | 6/2021 | Bolduc | G01S 7/487 |
| 2021/0325510 A1* | 10/2021 | Bialer | G01S 13/584 |
| 2022/0163649 A1* | 5/2022 | Li | G01S 7/354 |

OTHER PUBLICATIONS

German-language Written Opinion (PCT/ISA/237) issued in PCT Application No. PCT/EP2021/072024 dated Nov. 22, 2021 (six (6) pages).

* cited by examiner

METHOD FOR RECOGNIZING ROAD USERS IN AN ENVIRONMENT OF A VEHICLE ON THE BASIS OF MEASUREMENTS OF A RADAR SENSOR, BY IDENTIFYING FAULTY DETECTIONS, AND COMPUTING DEVICE

FIELD

The present invention relates to a method for recognizing road users in an environment of a vehicle. Furthermore, the present invention relates to a computing device for a vehicle. In addition, the present invention relates to a computer program and a computer-readable (memory) medium.

BACKGROUND AND SUMMARY

Modern vehicles having driver assistance systems comprise a plurality of sensors, to be able to detect objects in the environment of the vehicle. In the present case, radar sensors are of interest in particular. To detect the objects, the radar sensor emits radar signals or electromagnetic waves, which are then reflected at the object to be detected and are received as a reflected electromagnetic wave. The radar sensors measure the distance between the object and the vehicle on the basis of a time-of-flight of the radar signal. They can moreover measure both the relative radial velocity between the vehicle and the object and also the object angle, i.e., the angle between an imaginary connecting line to the object and a reference line, such as the vehicle longitudinal axis.

A plurality of detections are determined on the basis of the measurements of the radar sensor, which describe potential objects in the environment of the vehicle. Due to reflections of the radar signal, there are detections in the vehicle environment which cannot be distinguished from real detections on the basis of their properties. Such detections are also referred to as faulty detections or clutter. These faulty detections usually originate from actually present objects, but are output at another point due to reflections of the radar signal which cannot be acquired by the radar sensor. These faulty detections are typically correlated over time and therefore describe a realistic movement. These faulty detections can therefore be recognized as a potential, and thus hazardous, road user and it is possible to react to the supposed objects. This results in an incorrect reaction of the vehicle or a driver assistance system and in the worst case in full braking with possibly severe effects on the following traffic.

Furthermore, suppressing faulty detections based on properties of the sensor signal or the detections is known from the prior art. These properties can be determined directly from the time signals, for example on the basis of the processing of the raw signal, the polarization, and/or a frequency analysis, or from discrete properties, for example the radar cross section. Furthermore, threshold values can be determined, below which these detections are output, and otherwise are suppressed at the sensor. If these threshold values for the triggering are set lower, in order to prevent a reaction to an incorrectly recognized object, objects are only recognized late and the reaction time for the vehicle is shortened, so that the driver assistance system only reacts too late in critical situations.

For this purpose, EP 2 667 219 A1 discloses a method and system for detecting radar objects using an angle-resolving radar sensor of a motor vehicle in the presence of an object which is laterally extended adjacent to the ego lane in the travel direction and reflects radar waves. In this case, a measured position distribution which corresponds to a distribution of directional angles of received radar signals of the radar sensor reflected from a radar object is compared using a model to a position distribution, which is expected in consideration of the presence of the object extended adjacent to the ego lane in the travel direction and is dependent on a distance from the radar object. A position of a radar object is then determined based on the result of the comparison.

It is an object of the present disclosure to disclose a solution for reliably reducing faulty detections in measurements using a radar sensor of a vehicle, a result of which being that road users can be recognized more reliably.

This object is achieved according to the present disclosure by a method, by a computing device, by a computer program, and by a computer-readable medium (e.g., a memory) having the features as disclosed herein. Advantageous refinements of the present invention are also disclosed herein.

A method according to the present disclosure is used for recognizing road users in an environment of a vehicle. The method comprises determining detections which describe potential objects in the environment of the vehicle. In this case, the detections are each determined for chronologically successive measurement cycles of a radar sensor of the vehicle, wherein in one measurement cycle, a radar signal is emitted using the radar sensor and the radar signal reflected in the environment is received again. In addition, the method comprises identifying faulty detections within the detections and recognizing the road users on the basis of the detections different from the faulty detections. It is provided here that, for identifying the faulty detections for the respective detections, it is checked, on the basis of the spatial location in relation to further detections, whether the detection originates from a reflection effect of a plurality of predetermined reflection effects of the radar signal, wherein the plurality of predetermined reflection effects describes at least one further reflection of the radar signal after an initial reflection of the radar signal on an object.

With the aid of the method, the road users and in particular moving road users in the environment of the vehicle are recognized. From the numerous objects in the environment of the vehicle, objects are identified that are relevant to the vehicle. Furthermore, the number of faulty detections is reduced using the method. The method can be carried out using a corresponding computing device of the vehicle. This computing device can be formed, for example, by an electronic control unit of the vehicle. This computing device can be connected to the radar sensor of the vehicle for data transfer. The sensor data which are ascertained using the radar sensor can thus be transferred to the computing device and evaluated by means of the computing device. The detections can be determined therefrom. It can also be provided that the detections are output using the radar sensor and transferred to the computing device.

The chronologically successive measurement cycles can be carried out using the radar sensor. In each measurement cycle, the radar signal or an electromagnetic wave is emitted using the radar sensor. Furthermore, the radar signal reflected in the environment of the vehicle is received again using the radar sensor. The distance between the radar sensor and the objects can then be determined on the basis of the time-of-flight between the emission of the radar signal and the reception of the radar signal reflected from the object. Furthermore, a relative radial velocity between the vehicle and the object can be determined on the basis of a Doppler shift between the emitted and the received radar signal. The relative radial velocity describes the velocity component of the object which is directed along a beam from the radar sensor to the object. Thus, only the radial component of the velocity can be determined by means of the radar sensor. In addition, the angle or the target angle between a longitudinal axis of the vehicle and the object can be determined. The detections are determined in each measurement cycle. These detections describe possible or potential objects in the environment of the vehicle. A distance value can be assigned to the respective detections, which describes the distance between the radar sensor and the object. Furthermore, a velocity value can be assigned to the detections, which describes the relative radial velocity or the Doppler velocity between the radar sensor and the objects. In addition, an angle value can be assigned to the detections, which describes the angle between the radar sensor and the object. In particular, the angle value can be determined with respect to an azimuth direction.

To be able to recognize the road users reliably, it is necessary to identify the faulty detections within the detections. The road users are only to be recognized in this case on the basis of those detections which are not faulty detections. The goal is thus to identify the faulty detections and not take them into consideration in the recognition of the road users. The detections can be checked individually and initially can be viewed as potential faulty detections. In order to be able to identify the faulty detections, in the present case, the location correlation between the detections is studied. For a presently studied detection or a potential faulty detection, the position is checked in dependence on the further detections. It can then be found out in this way whether the presently checked detection originates from the predetermined reflection effect. In particular, it is recognized whether the detection originates from a reflection effect of the plurality of predetermined reflection effects. The respective predetermined reflection effects describe cases in which the emitted radar signal is reflected once again after the initial reflection on an object in the environment, before it reaches the radar sensor again or is received by the radar sensor. This further reflection of the radar signal can take place on the same object, another object, and/or the vehicle itself. It can also be the case that the radar signal is reflected multiple times after the initial reflection before it is received again by the radar sensor. These reflection effects represent systematic errors in operation of the radar sensor. When these reflection effects are recognized, faulty detections or clutter can be recognized reliably.

Detections from at least two of the successive measurement cycles are preferably associated with one another, wherein detections in the case of which an association does not take place are assumed to be faulty detections. In addition to the location correlation of the detections, the chronological correlation of the detections can also be studied. To ascertain the chronological correlation, the detections of at least two chronologically successive measurement cycles are studied. Corresponding detections from the successive measurement cycles can be ascertained here. It can be ascertained, for example, in the case of a detection from a preceding measurement cycle, whether a corresponding detection can be found in a present measurement cycle in direct proximity. If no corresponding detection can be found to a detection, this is considered to be a faulty detection and is not taken into consideration for the recognition of the road user. In this way, faulty detections can be recognized in a simple and reliable manner. It is provided in particular here that, firstly, the chronological correlation is observed, and the location correlation is studied subsequently thereto. In this way, the computing time for recognizing the faulty detections can be reduced.

In a further embodiment, checking whether the detection originates from the predetermined reflection effect is only carried out for detections which are assigned to dynamic objects in the environment. As already explained, a velocity value can be assigned to the respective detections. This velocity value describes in particular the absolute radial velocity between the vehicle and the object. In order to determine the absolute radial velocity, the ego movement of the vehicle can be determined. The ego movement of the vehicle can be ascertained on the basis of odometry or the like. It can be recognized on the basis of this velocity value whether the object to which the detection is assigned is a static or dynamic object. In the present case, in particular only the detections that originate from a dynamic object are studied. In the present case, the term detection without additional specifications is to be understood in particular as a dynamic detection. Such dynamic detections can describe relevant road users in the surroundings of the vehicle.

In one specific embodiment, one of the predetermined reflection effects describes at least two reflections of the radar signal on the same object and the detection is assumed to be a faulty detection if the detection is arranged behind a further detection starting from the radar sensor. One of the predetermined reflection effects can thus describe the case that the emitted radar signal is reflected multiple times on the same object. The radar signal can be reflected multiple times on the road user. The radar signal can be reflected on components of the road user, for example, on the exhaust system, before it is received by the radar sensor. In the case of this reflection effect, the faulty detection is assigned a higher distance value due to the multiple reflections and the thus resulting longer time-of-flight than a detection which originates from a direct reflection of the radar signal on the road user. A direct reflection is to be understood in the present case to mean that the radar signal is emitted by the radar sensor, is then reflected once on the object, and is subsequently received by the radar sensor. Detections which are arranged behind at least one further detection starting from the radar sensor can thus be viewed as possible faulty detections.

It is provided in particular in this case that the detection is moreover assumed to be a faulty detection if the detection is arranged outside a predetermined object range which is assigned to the further detection and/or if velocity values of the detection and the further detection are essentially equal. If, in the case of a presently checked detection, at least one further detection is recognized which has a lesser distance to the radar sensor, an object range can be assigned to this at least one further detection. This object range can be defined so that it has typical dimensions of a road user, for example, a passenger vehicle or truck. If the presently studied detection is located outside this object range, this can be assumed to be a faulty detection. Alternatively or additionally, it can be checked whether the velocity values of the presently studied detection and the at least one further detection are essentially equal or are in a predetermined tolerance range. Furthermore, it can be checked whether the angle values of the presently studied detection and the at least one further detection are in a predetermined angle range, in particular in an angle range for the azimuth angle. Faulty detections which originate from a multiple reflection on the same object typically have similar velocity values and/or angle values as the further detections which originate from the direct reflection on the object. In this way, faulty detections which originate from multiple reflections of the radar signal on the same object can be recognized reliably.

According to a further embodiment, one of the predetermined reflection effects describes a multiple reflection of the radar signal between the vehicle and an object and the detection is assumed to be a faulty detection if a distance value and/or a velocity value of the detection is essentially a multiple of a distance value and/or a velocity value of the further detection. A further reflection effect is the multiple reflection of the radar signal between the vehicle and the object or road user. The radar signal emitted by the radar sensor is initially reflected here on the object, then reflected on the vehicle, and subsequently reflected on the object again before it is received by the radar sensor. The radar signal can thus be reflected twice between the vehicle and the object. It can also be the case that the radar signal is reflected three times between the vehicle and the object. Faulty detections which originate from a multiple reflection have a distance value and/or a velocity value which is a multiple of the distance value and/or velocity value of a detection which is assigned to a road user. Tolerance ranges can also be specified for the distance values and/or the velocity values. If a studied detection is in such a tolerance range, it can be viewed as a faulty detection. Moreover, it can be taken into consideration that such multiple reflections usually only occur at short distances, for example, at distances less than 20 m, between the vehicle and the object. In this way, faulty detections which originate from multiple reflections can also be recognized.

In a further embodiment, one of the predetermined reflection effects describes the further reflection of the radar signal on an object and the detection is assumed to be a faulty detection if it describes a mirroring of a further detection on the object. A further predetermined reflection effect describes the case that a faulty detection arises by means of a mirroring on an object. The radar signal can be reflected on a reflective object, for example, after the reflection on a road user—due to which the further detection results—before it is again received by the radar sensor. The faulty detection then describes the mirroring of a detection from an actually existing object or a road user. Such an object, which represents a mirror, can in principle be a static object, such as a guide rail, or a dynamic object, for example a truck. It can initially be checked for this purpose whether possible mirrors are recognized on the basis of the detections. If, for example, detections from static objects are recognized, these can be assumed to be possible mirrors. It can then be checked whether the detection is a mirroring of a further detection on a possible mirror. Corresponding reflection ranges can also be predetermined for this purpose, in which the potential faulty detection has to be present. Faulty detections which originate from mirrors can thus also be reliably recognized.

Overall, four different types of potential faulty detections or clutter are thus recognized according to the invention. On the one hand, it is checked on the basis of the chronological correlation whether faulty detections are present. On the other hand, it is checked on the basis of the location correlation whether faulty detections are present which originate from the three predetermined reflection effects. It can also be provided that a probability is determined that the detection is a faulty detection. For all above-described types of faulty detections, respective individual probabilities can be determined and an overall probability can be derived therefrom for each detection.

Furthermore, it is advantageous, for the check as to whether the detections originate from the predetermined reflection effect, if the detections are sorted as a function of a distance value assigned to the detections. The acquired detections can be classified into static detections and dynamic detections. Corresponding lists can then be created for the static and dynamic detections, in which the detections are listed as a function of the distance. Checks can thus be carried out as a function of the distance or the position of the detections with little computing effort, since faulty detections can only be caused by detections at shorter distance.

In the method according to the invention, the detections of the radar sensor can be used as input data, which comprise a distance value, a velocity value, and an angle value. Known methods for suppressing faulty detections can also be applied to these detections. A list of these detections can be output as the output, wherein detections which have been recognized as a faulty detection are marked or labeled accordingly. If it is known which of the detections can be a faulty detection, the subsequent algorithms can be significantly improved.

In the rapid recognition of critical road users, it is very important that a so-called track for an object is reported as quickly as possible so that sufficient time remains for a reaction of the vehicle. In contrast thereto, false-positive object detections are not to be reported, for example, to avoid incorrect braking actions. A further advantage results for the estimation of the position and/or spatial dimensions of objects which can be carried out significantly more reliably due to the knowledge of the possible faulty detections.

A computing device according to the invention for a sensor system of a vehicle is designed or configured to carry out a method according to the invention in advantageous embodiments thereof. The computing device can be formed in particular by an electronic control unit of a vehicle.

A sensor system according to the invention for a vehicle comprises a computing device according to the invention. Moreover, the sensor system comprises a radar sensor. The radar sensor can be designed as a frequency-modulated continuous-wave radar. The sensor system can also comprise a plurality of radar sensors. In addition, the sensor system can comprise at least one sensor, using which the ego movement of the vehicle can be determined. Moreover, the sensor system can have a memory, in particular a ring memory, on which detections can be stored. The sensor system is used to recognize road users in the environment of the vehicle. The sensor system can be part of a driver assistance system of the vehicle.

A vehicle according to the invention comprises a driver assistance system according to the invention and/or a computing device according to the invention. The vehicle is designed in particular as a passenger vehicle. It can also be provided that the vehicle is designed as a utility vehicle.

A further aspect of the invention relates to a computer program, comprising commands which, upon execution of the program by a computing device, prompt it to carry out a method according to the invention and the advantageous embodiments thereof. Furthermore, the invention relates to a computer-readable (memory) medium, comprising commands which, upon execution by a computing device, prompt it to carry out a method according to the invention and the advantageous embodiments thereof.

The preferred embodiments presented with reference to the method according to the invention and the advantages thereof apply accordingly to the computing device according to the invention, the sensor system according to the invention, the vehicle according to the invention, the computer program according to the invention, and to the computer-readable medium (e.g., memory) according to the invention.

Further features of the invention result from the claims, the figures, and the description of the figures. The features and combinations of features mentioned above in the description, and the features and combinations of features mentioned hereinafter in the description of the figures and/or shown solely in the figures are usable not only in the respective specified combination but also in other combinations or alone, without leaving the scope of the invention.

The invention will now be explained in greater detail on the basis of preferred exemplary embodiments and with reference to the appended drawings.

DETAILED DESCRIPTION

In the figures, identical or functionally identical elements are provided with identical reference signs.

Figure 1:
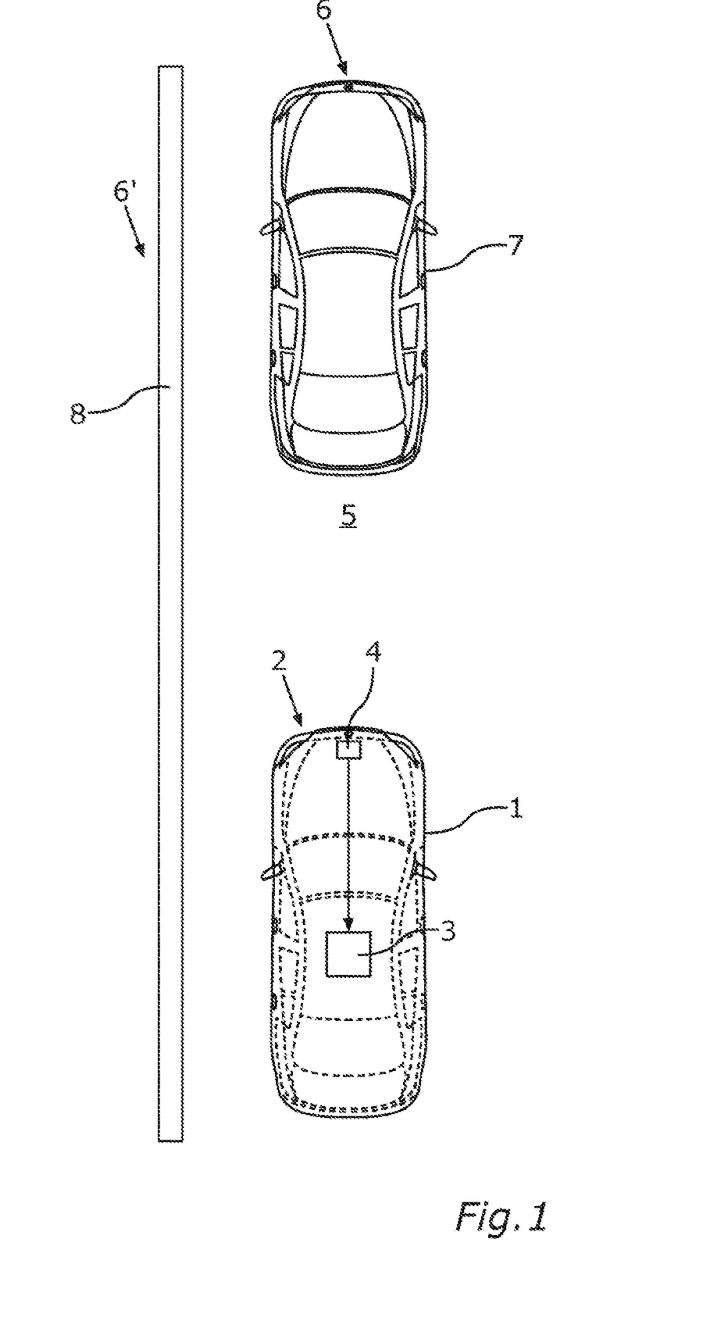
FIG. 1 shows a schematic representation of a vehicle, which has a sensor system having a radar sensor, and objects in an environment of the vehicle.

FIG. 1 shows a schematic representation of a vehicle 1, which is designed in the present case as a passenger vehicle, in a top view. The vehicle 1 is located in a traffic situation, in which two objects 6, 6' are located in an environment 5 of the vehicle 1. A road user 7, which moves in the forward travel direction, is located in the travel direction in front of the vehicle 1 as the dynamic object 6. A static object 6' in the form of a guide rail 8 is located on the left adjacent to the vehicle 1.

The vehicle 1 comprises a sensor system 2, by means of which objects 6, 6' in the environment 5 of the vehicle 1 can be acquired. The sensor system 2 can be part of a driver assistance system of the vehicle 1. The sensor system 2 comprises a computing device 3, which can be formed, for example, by an electronic control unit of the vehicle 1. Furthermore, the sensor system 2 comprises a radar sensor 4. In principle, the vehicle 1 or the sensor system 2 can have multiple radar sensors 4. Chronologically successive measurement cycles are carried out using the radar sensor 4. In each measurement cycle, a radar signal or an electromagnetic wave is emitted and the radar signal reflected in the environment 5 is received again. Detections D, $D_C$, $D_S$, which describe potential objects 6, 6' in the environment 5, can then be determined on the basis of a comparison of the emitted radar signal and the received radar signal. These detections D moreover comprise a distance value, which describes the distance between the vehicle 1 and the object 6, a velocity value, which describes a relative radial velocity between the vehicle 1 and the object 6, and an angle value, which describes an angle between the vehicle 1 and the object 6.

In the case of radar sensors 4, many faulty detections $D_C$ or clutter may occur in the automobile surroundings. These faulty detections $D_C$ can be interpreted by the sensor system 2 as real objects 6. This can result in errors in operation of the vehicle 1 or the driver assistance system of the vehicle 1. These faulty detections $D_C$ can originate from predetermined reflection effects. In the case of these predetermined reflection effects, the emitted radar signal, which was reflected for the first time on an object 6 in the environment 5, is reflected at least one further time in the environment 5 before it is received again by the radar sensor 4. Examples of predetermined reflection effects are shown hereinafter in FIG. 2 to FIG. 5.

Figure 2:
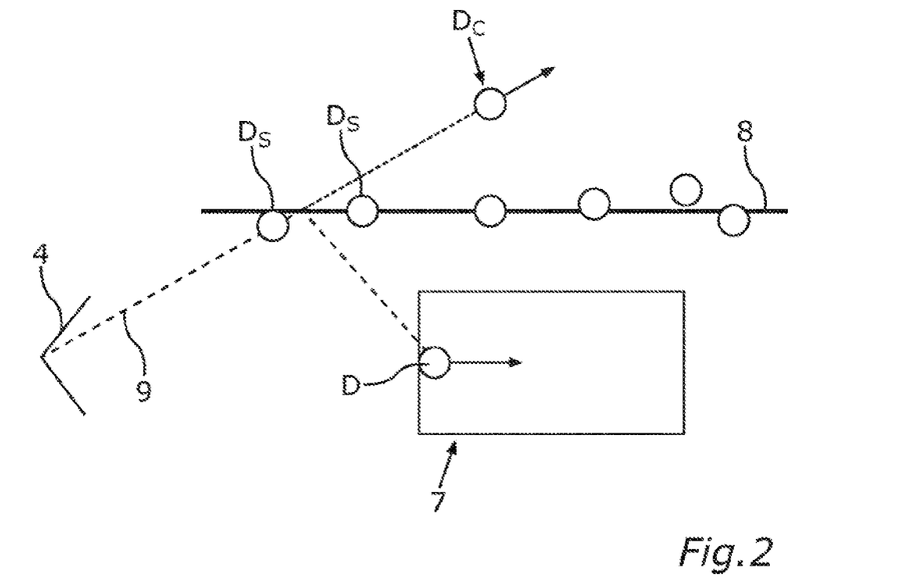
FIG. 2 shows a schematic representation of the detections which are determined on the basis of the measurements using the radar sensor, wherein a faulty detection is generated because of a reflection of the radar signal on a static object.

FIG. 2 shows a schematic representation of the traffic situation according to FIG. 1. In the present case, only the radar sensor 4 is indicated of the vehicle 1. Moreover, the detections D, $D_C$, $D_S$ are shown, which are acquired on the basis of the measurements using the radar sensor 4. A dynamic detection D is assigned to the road user 7 or the rear side of the road user 7. This detection D originates from the direct reflection of the radar signal on the road user 7. Furthermore, multiple detections $D_S$ are acquired, which describe the static object 6' or the guide rail 8.

In the example shown, the emitted radar signal is also reflected on the guide rail 8 after the reflection on the road user 7. The expansion of the radar signal for the return travel is illustrated by the line 9. A further possibility would be that the signal is also reflected on the guide rail 8 on the way back. This additional reflection of the radar signal cannot be recognized by the radar sensor 4. In this case, the moving object 6 or the road user 7 generates a chronologically stable faulty detection $D_C$ behind the guide rail 8. This faulty detection $D_C$ has a similar velocity value as the detection D. The velocity values are not identical, since the angles differ.

Figure 3:
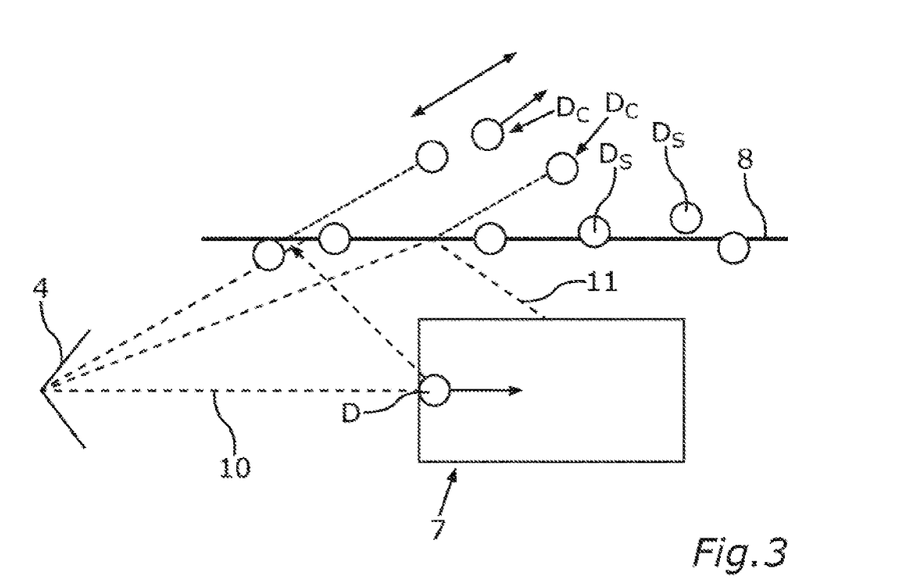
FIG. 3 shows a schematic representation of further faulty detections which are generated because of a reflection of the radar signal on a static object.

Further faulty detections $D_C$ are shown in conjunction with FIG. 3, which can occur in such a traffic situation. For example, a further faulty detection $D_C$ can result on the basis of another signal path of the radar signal. This signal path is illustrated by the line 10. Moreover, the emitted radar signal can be reflected at another point on the road user 7 or on the nonvisible side of the road user 7. In the example, the signal path is described by the line 11. A further faulty detection $D_C$ also results in this way. The faulty detections $D_C$ have a similar distance value and/or velocity value as the detection D. The additional reflection of the radar signal on a static object 6' shown in FIGS. 2 and 3 represents a predetermined reflection effect.

Figure 4:
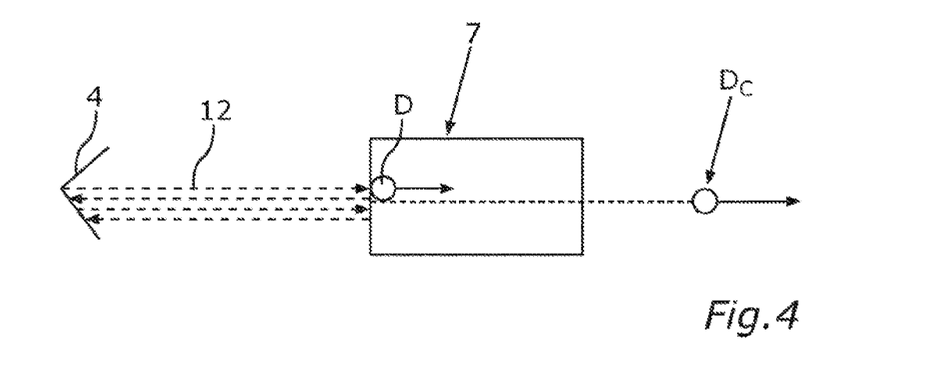
FIG. 4 shows a schematic illustration of a faulty detection which is generated because of a multiple reflection of the radar signal.

A further predetermined reflection effect is shown in FIG. 4, which can occur, for example, in the traffic situation according to FIG. 1. The radar signal emitted by the radar sensor 4 is reflected on the road user 7 here and reaches the vehicle 1 again. At the vehicle 1, the radar signal is reflected once again in the direction of the road user 7. On the road user 7, the radar signal is reflected a second time before it is received by the radar sensor 4. In total, the emitted radar signal—as indicated by the lines 12—is reflected twice between the vehicle 1 and the road user 7. This multiple reflection represents a predetermined reflection effect. This multiple reflection usually occurs when the distance between the radar sensor 4 and the object 6 or the road user 7 is small. A faulty detection $D_C$ results due to the multiple reflection, which is arranged behind the detection D originating from the radar sensor 4. The faulty detection $D_C$ has a distance value which corresponds to approximately twice the distance value of the detection D. Moreover, the velocity value of the faulty detection $D_C$ corresponds to approximately double the velocity value of the detection D.

Figure 5:
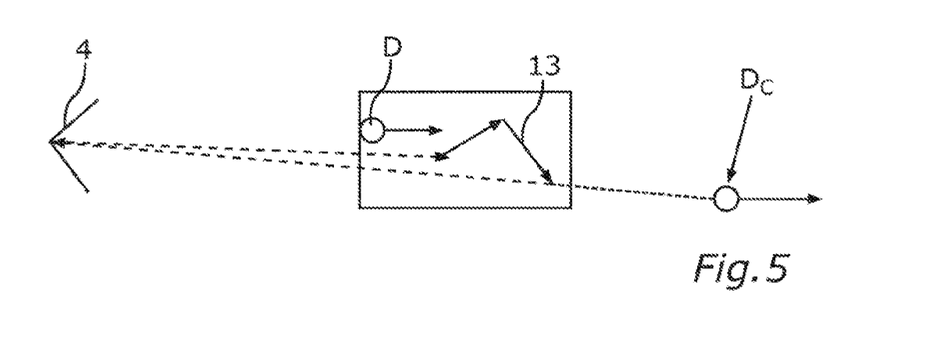
FIG. 5 shows a schematic representation of a faulty detection which is generated because of a multiple reflection of the radar signal on the road user.

The example of FIG. 5 describes a further predetermined reflection effect, which can occur, for example, in the traffic situation according to FIG. 1. In this case, the emitted radar signal is reflected multiple times on the object 6 or the road user 7 before it is received again by the radar sensor 4. This is illustrated in the present case by the line 13. The radar signal is often reflected multiple times on the underside of a road user 7. The reason for this is that the radar sensor 4 is typically arranged at a low installation height on the vehicle 1. The emitted radar signal can thus be reflected on structural components, for example the exhaust system, of the road user 7. Due to this multiple reflection of the radar signal on the road user 7, a faulty detection $D_C$ results, which is arranged behind the detection D originating from the radar sensor 4. The faulty detection $D_C$ has a velocity value which essentially corresponds to the velocity value of the detection D.

Figure 6:
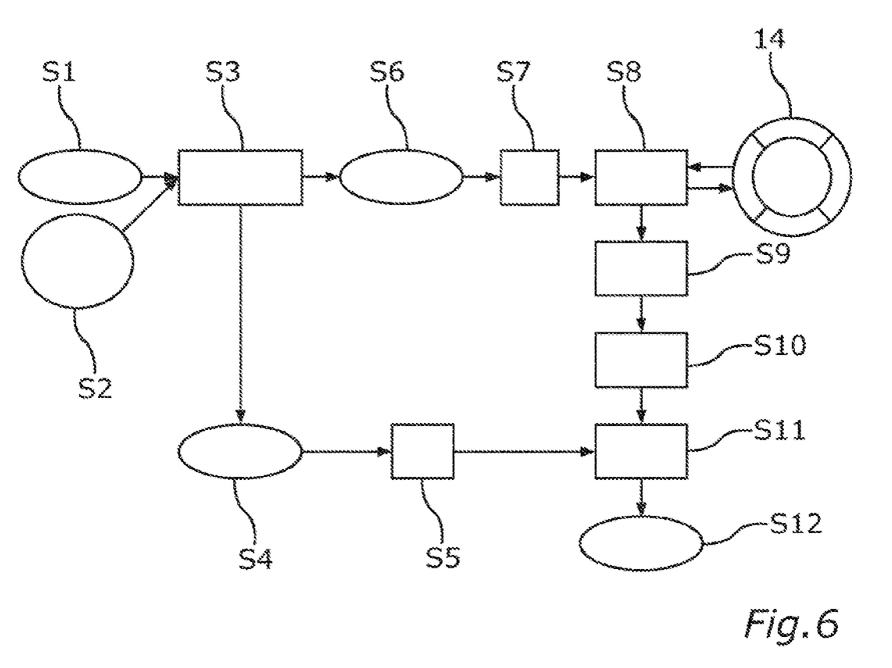
FIG. 6 shows a schematic flow chart of a method for recognizing road users in the environment of the vehicle.

FIG. 6 shows a schematic flow chart of a method for recognizing detections D of road users 7 in the environment 5 of the vehicle 1. In a step S1, the detections D, $D_C$, $D_S$ are determined on the basis of the measurements using the radar sensor 4. In a step S2, the ego movement of the vehicle 1 is determined. Corresponding sensors can be used for this purpose, by means of which the ego movement of the vehicle 1 can be determined on the basis of odometry. The velocity at which the radar sensor 4 moves can then be derived from the ego movement of the vehicle 1. An absolute radial velocity between the radar sensor 4 and a respective object 6 can then be determined on the basis of the velocity of the radar sensor 4 and the velocity value of the respective detections D.

On the basis of the absolute radial velocity, in a step S3, the respective detections D, $D_C$, $D_S$ are then assigned to static objects 6' and dynamic objects 6 in the environment 5. In a step S4, the static detections $D_S$ are then determined and, in a step S5, they are sorted as a function of the distance or their distance value. Static detections $D_S$ play a subordinate role and the recognition of faulty detections $D_C$ is less relevant in the case of these. In a step S6, the dynamic detections D are output and, in a step S7, they are sorted as a function of the distance. A faster calculation can be enabled by the sorting of the static detections $D_S$ and the dynamic detections D, since for all reflection effects, only close detections D have an effect on more remote detections D.

In a step S8, a chronological analysis of the detections D is then performed. For this purpose, correlations between the respective detections D, which are determined in the individual measurement cycles, are checked. For this purpose, the list having the dynamic detections D is stored for a predetermined number of measurement cycles, for example, two to four measurement cycles, in a ring memory 14. A current list can be compared to a preceding list from the ring memory 14 in this case. Furthermore, it is checked whether a detection D can be assigned a preceding detection D in the immediate environment. A rough estimation can be carried out here on the basis of the distance values of the detections D in the lists. Furthermore, the ego movement of the vehicle 1 between the measurement cycles can be compensated. The relative radial velocity or the Doppler velocity can be used as a starting point for the deviation with respect to the distance and can be multiplied by the duration of the measurement cycle, wherein a tolerance range can be taken into consideration in addition. No items of velocity information are provided for the velocity component orthogonal to the radial velocity, which is also referred to as the cross range. In this case, a maximum velocity of a road user 7 can be multiplied by the duration of the measurement cycle. In city traffic, for example, a maximum velocity of 15 m/s can be assumed, so that a range of 1.5 m at an assumed cycle time of 0.1 s can be used for the velocity component orthogonal to the radial velocity. Furthermore, a tolerance range can be taken into consideration, which covers the dimensions of a typical road user. According to one alternative, a square having the area of 5 m×5 m can be used for simplification and/or for reducing the computing time. In a step S9, faulty detections $D_C$ are then identified, which originate from multiple reflections of the radar signal on the object 6 or road user 7. This is explained on the basis of FIG. 7, which shows multiple detections D, $D_S$ from a road user 7 in the travel direction in front of the vehicle 1 or the radar sensor 4. The goal is to recognize the detections D, $D_S$ behind the road user 7 which have a similar velocity value as the detections D which are assigned to the road user 7. For each detection D, $D_S$, all other detections D are checked as to whether they are arranged in a predetermined object range 16. This object range 16 can be selected so that it covers typical dimensions of road users 7. For example, the object range 16 can have a length of 5 m to 10 m. Furthermore, the dynamic detections are checked as to whether they are arranged in a predetermined angle range 15. This angle range 15 can extend originating from the radar sensor 4 in a range between −2° and +2° in the azimuth direction. If a predetermined number of further detections D is in this object range 16 and/or angle range 15, the detection D can be identified as a faulty detection $D_C$. In addition, the detections D, $D_S$ are checked as to whether they are in a similar velocity range, for example, in a velocity range of −1 m/s to +1 m/s, in relation to the detection.

Figure 7:
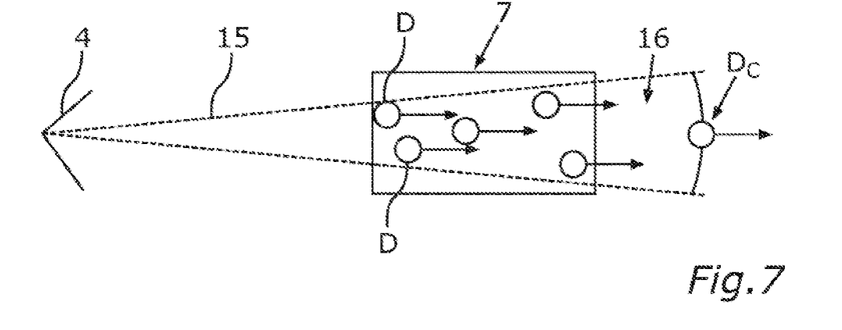
FIG. 7 shows a schematic representation of how a faulty detection can be recognized in the event of a multiple reflection of the radar signal on the same object.

Alternatively thereto, it can be provided that only the angle range 15 is specified and only a predetermined number of detections D, for example five detections D, are permitted in the angle range 15. In the example shown, five further dynamic detections D are already present in the angle range 15. It is therefore probable that the detection farthest away from the radar sensor 4 originates from a multiple reflection on the road user 7 and is therefore viewed as a faulty detection $D_C$.

Figure 8:
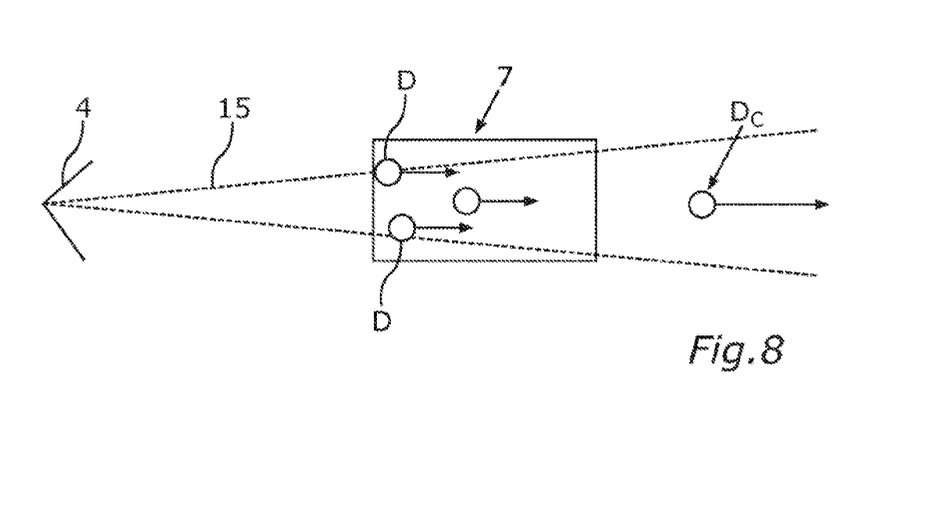
FIG. 8 shows a schematic representation of how a faulty detection can be recognized in the event of a multiple reflection of the radar signal between the vehicle and an object.

In a step S10 of the method according to FIG. 6, the faulty detections $D_C$ are recognized, which originate from a multiple reflection of the radar signal between the vehicle 1 and the road user 7. This is explained hereinafter in conjunction with FIG. 8. The goal here is to find detections D, $D_S$ which are located behind the road user 7 originating from the radar sensor 4 and the distance value of which is a multiple of the distance value of a detection D of the road user 7. It can moreover be taken into consideration here that the multiple reflections occur at comparatively small distances, for example, at distances less than 20 m. Furthermore, it can be checked whether the currently studied detection D and a further detection D are arranged in the above-described angle range 15. Moreover, it can be checked whether the distance value and/or velocity value of the currently studied detection D, $D_S$ is a multiple of the distance value and/or velocity value of a further detection D. Tolerance ranges can also be used here, for example, it can be checked whether the distance value and/or the velocity value of the currently studied detection is greater by a factor in the range between 1.8 and 2.2 or in a range between 2.8 and 3.2 than the distance value and/or velocity value of the further detection D. In particular, it is checked whether both the distance value and the velocity value are in these ranges. In the example of FIG. 8, this is given for the detection which is farthest away from the radar sensor 4. This is therefore viewed as a faulty detection $D_C$.

In a step S11 of the method according to FIG. 6, the detections are then recognized which originate from mirroring on further objects 6, 6'. This is explained hereinafter with reference to FIG. 9. Faulty detections $D_S$ are to be recognized which originate from mirroring on static or dynamic objects 6. For this purpose, all detections D are observed which are located in front of the presently checked potential faulty detection $D_C$ originating from the radar sensor 4 and which are in the same angle range. These detections $D_S$ are checked as to whether they can represent a possible "mirror" 17 for the radar signal. Furthermore, it is then checked whether a dynamic detection D is present, which has a similar distance to the possible mirror 17 as the potential faulty detection $D_C$. For this purpose, a reflection range 18 can be specified, which extends, for example, in an angle range between −60° and +60°, wherein the middle is left out. Moreover, it can be checked whether the potential faulty detection has a similar velocity value as the further detection D.

Figure 9:
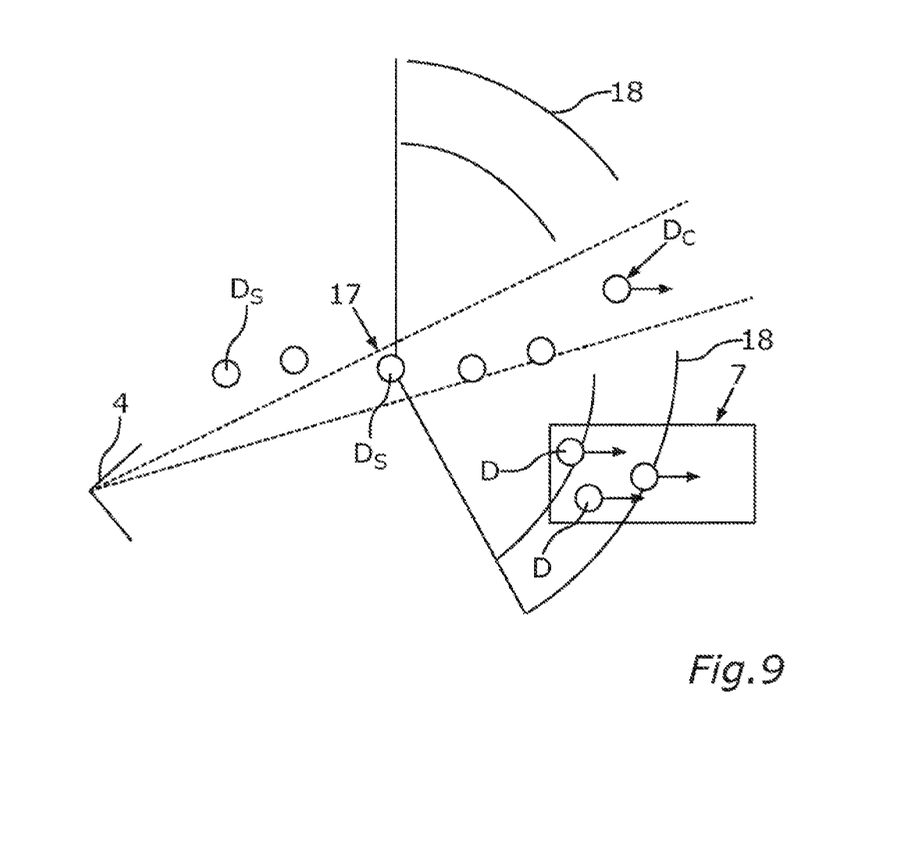
FIG. 9 shows a schematic representation of how a faulty detection from a mirroring on a further object can be recognized.
Figure 10:
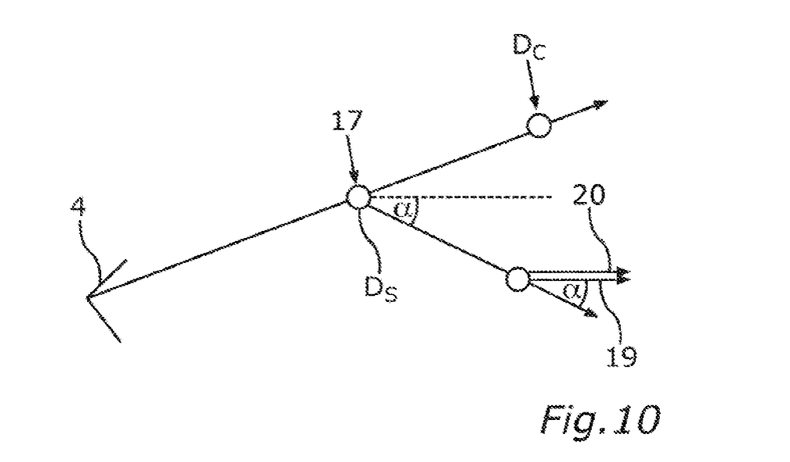
FIG. 10 shows a schematic representation of how a faulty detection from a mirroring on a further object can be recognized, according to a further embodiment.

The velocity values of the detections D and possible faulty detections $D_C$ can differ. If the vehicle 1 is located on a freeway, the vehicle 1 and a road user 7 are moving in parallel to the guide rail 8 or the possible mirror 17. The arrow 20 describes the actual movement direction of the road user 7 or the detection D which is assigned to the road user 7 in this case. The arrow 19 describes the measured velocity. In this case, the velocity value of the potential faulty detection $D_C$ is lower. In this case, the aspect angle α is half the angle between the potential faulty detection $D_C$ and the detection D of the road user 7. Here, the velocity $v_{DC}$ of the potential faulty detection $D_C$ can be computed according to the following formula as a function of the aspect and the velocity $v_D$ of the detection D:

$$v_{DC} = (1-\cos\alpha)v_D.$$

Figure 11:
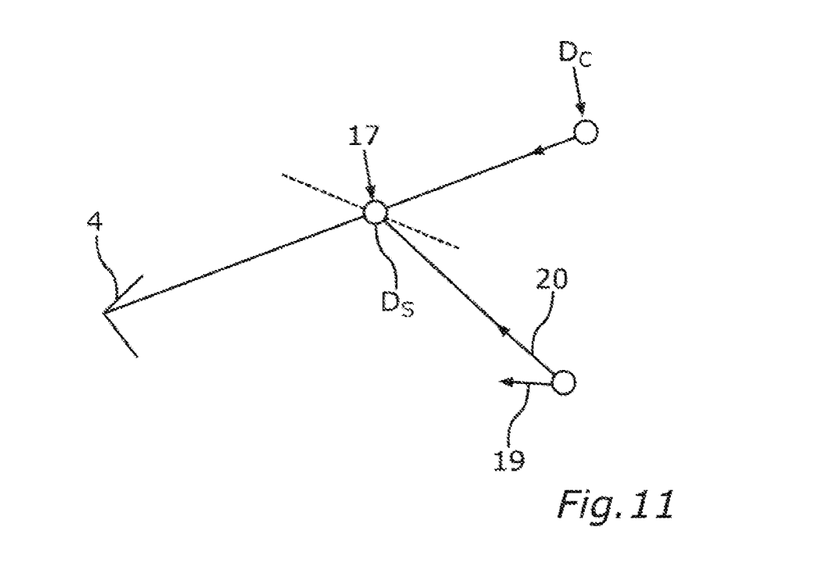
FIG. 11 shows a schematic representation of how a faulty detection from a mirroring on a further object can be recognized according to a further embodiment.

Situations can also occur in which road users 7 move toward the mirror 17 or move away from it. This can be the case in city traffic, for example. For this purpose, FIG. 11 shows a detection D which is assigned to a road user 7 which moves relative to the radar sensor 4. The arrow 20 describes the actual movement of the road user 7 and the arrow 19 describes the measured velocity of the road user 7 here. The measured velocity of the road user 7, which is determined in the radial direction in relation to the radar sensor 4, can be significantly greater here than the actual velocity of the road user 7 in this direction. In such traffic situations, the above-described tolerance ranges for the velocity values can be selected to be larger.

In particular, static objects 6' can be viewed as possible mirrors 17 for the radar radiation. These can be ascertained as shown in FIG. 6 on the basis of the static detections $D_S$. In a step S12 of the method, the detections D can then be output, wherein the faulty detections $D_C$ are marked.

In addition, it can be provided that the detections D from further radar sensors or also other environmental sensors are taken into consideration. Furthermore, the data of the sensors can be fused. In this way, for example, stationary or static objects 6', which can represent possible mirrors 17, can be recognized more reliably. Furthermore, it can be provided that a probability is determined for the respective detections D that it is a faulty detection $D_C$. Upon the recognition of a multiple reflection, respective probabilities can be determined for the distance value, the velocity value, and the angle value of the possible faulty detection $D_C$. The overall probability that it is a faulty detection $D_C$ can then be determined on the basis of the product of the individual probabilities. These probabilities can be determined for the respective reflection effects. Not only the reflection effect having the highest probability can be output here, but rather the respective probabilities for all reflection effects.

The invention claimed is:

1. A method for recognizing road users in an environment of a vehicle, the method comprising:
   determining detections that describe potential objects in the environment of the vehicle,
   wherein the detections are each determined for chronologically successive measurement cycles of a radar sensor of the vehicle, and wherein, in a measurement cycle, the radar sensor emits a radar signal and the radar sensor receives the radar signal reflected in the environment;
   identifying faulty detections within the detections; and
   recognizing the road users on a basis of the detections other than the faulty detections;
   wherein identifying the faulty detections further comprises checking, for respective detections on a basis of a spatial location in relation to other detections, whether the detection originates from a reflection effect of a plurality of predetermined reflection effects of the radar signal, wherein checking whether the detection originates from the predetermined reflection effect is performed only for detections that are assigned to dynamic objects in the environment, and
   wherein the plurality of predetermined reflection effects describes at least one additional reflection of the radar signal after an initial reflection of the radar signal on an object.

2. The method according to claim 1, further comprising:
   assigning detections from at least two of the successive measurement cycles to one another, wherein detections in which an assignment does not take place are assumed to be faulty detections.

3. The method according to claim 1,
   wherein one of the predetermined reflection effects describes at least two reflections of the radar signal on the same object, and
   wherein the method further comprises assuming a detection to be a faulty detection in response to the detection being arranged behind another detection originating from the radar sensor.

4. The method according to claim 3, further comprising:
assuming the detection to be a faulty detection in response to the detection being arranged outside a predetermined object range that is assigned to the another detection.

5. The method according to claim 3, further comprising:
assuming the detection to be a faulty detection in response to velocity values of the detection and the another detection being essentially equal.

6. The method according to claim 1,
wherein one of the predetermined reflection effects describes a multiple reflection of the radar signal between the vehicle and an object, and
wherein the method further comprises assuming a detection to be a faulty detection in response to a distance value and/or a velocity value of the detection being approximately a multiple of a distance value and/or a velocity value of another detection.

7. The method according to claim 1,
wherein one of the predetermined reflection effects describes the at least one additional reflection of the radar signal on an object, and
wherein the method further comprises assuming a detection to be a faulty detection if the detection describes a mirroring of another detection on the object.

8. The method according to claim 1,
wherein checking whether the detection originates from one of the reflection effects of the plurality of predetermined reflection effects further comprises sorting the detections as a function of a distance value assigned to the detections.

9. A computing device for a sensor system of a vehicle, wherein the computing device is configured to:
determine detections that describe potential objects in the environment of the vehicle,
wherein the detections are each determined for chronologically successive measurement cycles of a radar sensor of the vehicle, and wherein, in a measurement cycle, the radar sensor emits a radar signal and the radar sensor receives the radar signal reflected in the environment;
identify faulty detections within the detections; and
recognize the road users on a basis of the detections other than the faulty detections;
wherein the computing device is configured to identify the faulty detections by checking, for respective detections on a basis of a spatial location in relation to other detections, whether the detection originates from a reflection effect of a plurality of predetermined reflection effects of the radar signal, wherein checking whether the detection originates from the predetermined reflection effect is performed only for detections that are assigned to dynamic objects in the environment, and
wherein the plurality of predetermined reflection effects describes at least one additional reflection of the radar signal after an initial reflection of the radar signal on an object.

10. The computing device according to claim 9, wherein the computing device is configured to:
assign detections from at least two of the successive measurement cycles to one another, wherein detections in which an assignment does not take place are assumed to be faulty detections.

11. The computing device according to claim 9,
wherein one of the predetermined reflection effects describes at least two reflections of the radar signal on the same object, and
wherein the computing device is configured to assume a detection to be a faulty detection in response to the detection being arranged behind another detection originating from the radar sensor.

12. The computing device according to claim 11, wherein the computing device is configured to:
assume the detection to be a faulty detection in response to the detection being arranged outside a predetermined object range that is assigned to the another detection.

13. The computing device according to claim 11, wherein the computing device is configured to:
assume the detection to be a faulty detection in response to velocity values of the detection and the another detection being essentially equal.

14. The computing device according to claim 9,
wherein one of the predetermined reflection effects describes a multiple reflection of the radar signal between the vehicle and an object, and
wherein the computing device is configured to assume a detection to be a faulty detection in response to a distance value and/or a velocity value of the detection being approximately a multiple of a distance value and/or a velocity value of another detection.

15. The computing device according to claim 9,
wherein one of the predetermined reflection effects describes the at least one additional reflection of the radar signal on an object, and
wherein the computing device is configured to assume a detection to be a faulty detection if the detection describes a mirroring of another detection on the object.

16. The computing device according to claim 9, wherein the computing device is configured to:
check whether the detection originates from one of the reflection effects of the plurality of predetermined reflection effects further by sorting the detections as a function of a distance value assigned to the detections.

17. A non-transitory computer-readable medium, having stored thereon commands that, when executed by a computing device, cause the computing device to carry out a method comprising:
determining detections that describe potential objects in the environment of the vehicle,
wherein the detections are each determined for chronologically successive measurement cycles of a radar sensor of the vehicle, and wherein, in a measurement cycle, the radar sensor emits a radar signal and the radar sensor receives the radar signal reflected in the environment;
identifying faulty detections within the detections; and
recognizing the road users on a basis of the detections other than the faulty detections;
wherein identifying the faulty detections further comprises checking, for respective detections on a basis of a spatial location in relation to other detections, whether the detection originates from a reflection effect of a plurality of predetermined reflection effects of the radar signal, wherein checking whether the detection originates from the predetermined reflection effect is performed only for detections that are assigned to dynamic objects in the environment, and
wherein the plurality of predetermined reflection effects describes at least one additional reflection of the radar signal after an initial reflection of the radar signal on an object.

* * * * *